May 14, 1935.  J. H. PAYNE  2,001,543
CONTROL SYSTEM
Filed Jan. 23, 1930
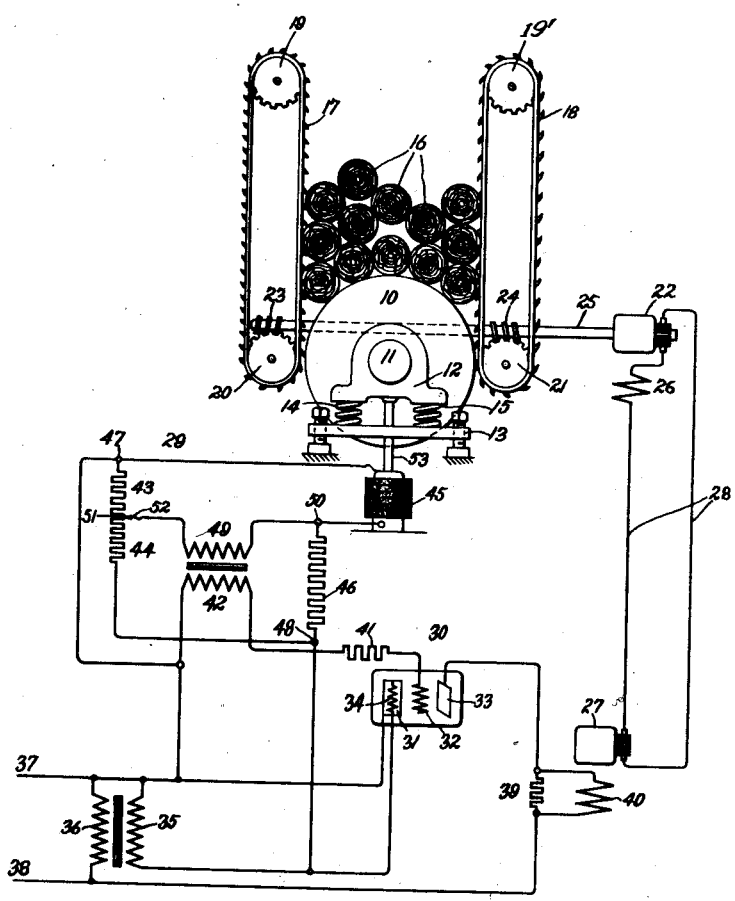
Inventor:
John H. Payne,
by Charles E. Tullar
His Attorney.

Patented May 14, 1935

2,001,543

UNITED STATES PATENT OFFICE 2,001,543

CONTROL SYSTEM

John H. Payne, Ballston Spa, N. Y., assignor to General Electric Company, a corporation of New York Application January 28, 1930, Serial No. 424,053

11 Claims. (Cl. 83—75)

This invention relates to control systems, more particularly to systems for controlling the operation of power driven machines, and has for an object the provision of a simple and reliable system for maintaining a predetermined operating condition of a power driven machine.

More specifically my invention relates to control systems for pulp grinding machines and the like, whereby a predetermined pressure is maintained between a work performing member such as the grind stone of the machine and the material supplied thereto, and wherein the control operation is carried out by means directly responsive to the pressure, such as described and claimed in United States Patent No. 1,951,225 of Paul Weiske and Konrad Rupprecht, dated March 13, 1934, assigned to the same assignee as this invention.

In carrying this invention into effect in one form thereof I provide the machine to be controlled with a pressure responsive resistance arranged to be controlled in response to the pressure on the work performing member of the machine together with electric discharge apparatus controlled thereby for controlling an operating condition of the machine.

In illustrating the invention in one form thereof I have shown it as employed to control the pressure of the logs on the grind stone of a pulp grinding machine.

For a better and more complete understanding of the invention reference should now be had to the following specification and to the accompanying drawing the single figure of which is a diagrammatical representation of an embodiment of the invention.

Referring now to the drawing, the grind stone 10 of a pulp grinding machine is mounted upon a shaft 11 so as to rotate therewith. One extremity of the shaft 11 is journaled in a suitable pedestal bearing 12, the opposite extremity of the shaft also being journaled in a suitable bearing (not shown). The pedestal bearing 12 is resiliently mounted with respect to the bed-plate 13 by means of the heavy coil springs 14 and 15, for the purpose of providing for slight deflections of the shaft 11 in response to the pressure of the load on the grind stone 10, which deflections are made use of for the purpose of controlling certain operating conditions of the machine.

The grind stone 10 is driven at a suitable speed which is preferably substantially constant, by any suitable driving means such for example as a synchronous motor (not shown) the drive shaft of which may be coupled to the shaft 11 upon which the grind stone 10 is mounted.

A suitable material, such for example as the logs 16, is forced against the roughened periphery of the rotating grind stone 10 by means of the endless feed chains 17 and 18; these chains being provided with hooks which engage the logs with which they come in contact. The endless feed chains 17 and 18 are passed over the idler pulleys 19 and 19' respectively and are driven by the drive pulleys 20 and 21 respectively, which in turn are driven by any suitable driving means such for example as the small electric feed motor 22; suitable driving connections to the motor 22 being made by means of the worms 23 and 24 mounted on the elongated shaft 25 of the drive motor 22 which engage with the cooperating worm teeth with which the drive pulleys 20 and 21 are provided at their peripheries.

Although the feed motor 22 may be of any suitable type it is preferably provided with a series field winding 26 and is supplied from any suitable source of electric supply such, for example, as the generator 27 to which it is connected by means of the supply conductors 28. The generator 27 is driven by any suitable driving means (not shown) such, for example, as an electric motor supplied from a suitable source.

For the purpose of controlling the operation of the feed motor 22, a Wheatstone bridge 29 and an electric discharge device 30 controlled thereby are provided.

The electric discharge device 30 is of the three electrode type being provided with a cathode 31, a grid 32 and a plate or anode 33. The device 30 shown in the drawing is preferably a three electrode electric discharge device into the envelope of which a small quantity of an inert gas such, for example, as mercury vapor is introduced after exhaust. The presence of such an inert gas within the envelope of the tube serves to change the usual electron discharge into an arc stream and thereby constitutes the tube an electrostatically or grid-controlled arc rectifier.

If an alternating electromotive force be supplied to the anode 33, current will flow in the output circuit, if at all, only during that half cycle of the electromotive force in which the anode is positive with respect to the cathode. By applying a suitable negative bias to the grid the time during the positive half cycle of anode voltage at which current starts to flow can be controlled, and by suitably varying the magnitude of this negative bias the starting time of the current can likewise be varied to any instant during that half cycle. Once current starts to flow in the output circuit it rises abruptly to a value limited only by the impedance of the circuit itself and continues to flow during the remainder of that half cycle. Thus, it will be understood by persons skilled in the art that although the grid is powerless to control the instantaneous value of the current in the output circuit it can nevertheless be made to control the average value of the current, since by properly controlling the negative grid bias the time of starting of the output current during each positive half cycle of the anode voltage can be controlled or varied as desired.

The cathode 31 is heated by means of the filamentary heating element 34 which is connected across the terminals of the secondary winding 35 of the filament transformer, the primary winding 36 of which is connected to a suitable source of alternating current supply such as that represented by the conductors 37 and 38. Alternating potential is applied to the anode 33 from the supply conductor 38 to which it is connected through the resistor 39.

The generator 27 which supplies the feed motor 22 is provided with a separately excited field winding 40 which is connected in parallel with the resistor 39. The output circuit of the electric discharge device 30 may be thus traced from the supply conductor 37 to the cathode 31, the anode 33, the resistor 39 and the field winding 40 in parallel and thence to the conductor 38.

For the purpose of applying a suitable negative bias to the grid the latter is connected through the protective resistance 41 and the secondary winding 42 of the Wheatstone bridge transformer to the supply conductor 37 the polarity of which is negative when the polarity of the anode 33 is positive.

The Wheatstone bridge is provided with the usual four resistance arms 43, 44, 45 and 46; the opposite terminals 47 and 48 of the bridge being connected to the terminals of the secondary winding 35 of the filament transformer and being supplied with alternating current therefrom. The primary winding 49 of the bridge transformer is connected between the points 50 and 51 of the bridge which points are equipotential points when the bridge is balanced, i. e., when the ratio between the arms 43 and 44 is equal to the ratio between the arms 45 and 46. The ratio between the arms 43 and 44 may be varied as desired by changing the position of the movable contact 52 on the resistance forming these arms.

As shown in the drawing the arm 45 of the bridge is a carbon pile resistance the ohmic value of which varies in inverse proportion to the amount of pressure applied to the discs of which it is composed. The pressure on the discs of the carbon pile is varied in response to deflections of the resiliently mounted shaft 11 by means of the connecting rod 53 which is arranged to transmit pressure in varying degrees to the carbon pile resistance in response to changes in the pressure of the logs 16 on the grindstone 10. A variation of the resistance of the carbon pile will vary the amount of current flowing in the arms 45 and 46 and will consequently change the potential of the point 50 with respect to that of the point 51 causing an alternating current to flow in the primary winding 49 which induces an electromotive force in the secondary winding. This induced electromotive force will proportionately alter the magnitude of the negative bias applied to the grid and likewise the magnitude of the current supplied to the field winding 40 of the generator 27. As a result of the change in the excitation of the generator the speed of the feed motor 22 which is supplied therefrom will be changed in proportion.

Likewise by altering the position of movable contact 52 on the resistance forming the arms 43 and 44 of the bridge the respective potentials of the points 50 and 51 may be varied to effect a change in the speed of the feed motor 22 in the above described manner. Since the pressure of the logs 16 upon the grindstone 10 under normal conditions of operation will depend upon the speed of the feed motor 22, it will consequently be clear that for each position of movable contact 52 upon the resistance forming the arms 43 and 44, the motor 22 will feed the logs 16 against the stone 10 at a corresponding definite pressure that may be varied as desired by varying the position of the movable contact 52.

With the above understanding of the apparatus and elements comprised in an embodiment of the invention and their organization with respect to each other in the system, the operation of the system itself will readily be understood from the description that follows: Assuming the grindstone 10 to be driven at a substantially constant speed, the movable contact 52 is adjusted to a point on the bridge which corresponds to the value of the pressure of the logs 16 against the stone 10 that it is desired to maintain.

As long as the log pressure on the stone remains at the desired value the deflection of the resiliently mounted shaft 11 will compress the carbon pile 45 just sufficiently to produce that unbalance of the bridge necessary to cause the feed motor 22 to feed the logs 16 at the rate required under normal conditions to maintain the pressure of the logs 16 against the stone 10 at the desired value.

Should the pressure of the logs 16 on the grind stone 10 increase above the predetermined value which it is desired to maintain, the shaft 11 will be slightly deflected below its former position as a result of which the increased pressure will be transmitted to the carbon pile resistance 45 through the connecting rod 53, thereby increasing the pressure on the carbon pile and reducing its resistance. The terminal 48 of the bridge is connected to that terminal of the secondary winding 35 of the filament transformer which is positive when the potential applied to the anode is positive. The reduction of the resistance of the carbon pile 45 due to the increase in pressure thereon causes the current flowing in the arms 45 and 46 to increase and thus the potential of the point 50 is made increasingly negative with respect to the potential of the point 51. Consequently, the value of the negative bias applied to the grid 32 by the secondary winding 42 of the bridge transformer is increased, thereby reducing the average value of the current which flows in the field winding 40 of the generator 27. The excitation of the generator 27 being reduced the voltage which is applied to the motor 22 and consequently its speed is likewise reduced which in turn results in a reduction in the rate at which the logs 16 are forced against the grind stone 10 and consequently in a reduction in the pressure of the logs on the grind stone.

When the pressure on the stone 10 has been reduced to the normal value the shaft 11 will be returned to its normal position thereby reducing the pressure on the carbon pile resistance 45 to its normal value and the electric discharge device 30 will function as before to supply normal current to the field winding 40 of the field generator 27 which will then supply the motor 22 with just the amount of current necessary to force the logs 16 against the grind stone 10 at normal pressure.

From the description given above it will be clear that if the pressure of the logs on the grind stone 10 should for any reason decrease that the shaft 11 will deflect in the opposite direction from that just described and the pressure on the carbon pile resistance 45 will be decreased below its normal value as a result of which the negative potential of the point 50 will be made decreasingly negative with respect to the point 51 thereby reducing the value of the negative bias applied to the grid 32 of the electric discharge device 30 and increasing the average value of the current supplied to the field winding 40 of generator 27. The excitation of the generator 27 being increased, the speed of the motor 22 will likewise be increased and as a result the logs 16 will be forced against the grind stone 10 at a faster rate thereby increasing the pressure on the grind stone 10. When the pressure has reached the normal value which it is desired to maintain, the shaft 11 will again assume its normal position and the pressure on the carbon pile will be restored to its normal value thereby resulting in the feed motor 22 operating at the normal speed required to hold the logs 16 against the grind stone 10 at the normal pressure.

It will thus be clear that my system functions as a load regulator and operates either in response to an increase in the pressure above normal or a decrease in the pressure below normal to change the rate at which the logs are fed to the grind stone to restore the pressure to its normal value.

Although for the purpose of simplicity I have illustrated the electric discharge device 30 as a device connected for half wave rectification, it will be understood that the invention is by no means limited thereto since persons skilled in the art will understand that the electric discharge device 30 may with but slight changes in the connections be replaced by an electric discharge device or devices connected for full wave rectification.

Although in accordance with the provisions of the patent statutes I have described my invention as embodied in specific apparatus organized in a particular manner I would have it understood that the apparatus and connections shown are merely illustrative and the invention is not limited thereto since alterations and modifications will readily suggest themselves to persons skilled in the art without departing from the true spirit of the invention or the scope of the annexed claims.

What I claim as new and desire to secure by Letters Patent of the United States, is:—

1. A control system for a machine having a work performing member, means for applying a load to said member so that a varying pressure is applied thereto, a space current device provided with an input circuit and an output circuit, a pressure responsive resistance connected to said input circuit for controlling the current in said output circuit, resiliently mounted bearing means for providing deflections of said member proportional to the load pressure thereon, means responsive to said deflection for applying a pressure to said resistance and varying the current in said output circuit, and means responsive to the current in said output circuit for controlling the operation of said load applying means.

2. In a control system for a machine provided with a work performing member, a drive shaft supporting said member, resilient means mounting said shaft and providing for deflections of said shaft proportionally to the pressure of the load thereon, means for supplying a material to said work performing member, a control circuit including a compressible carbon pile resistance, means mounting said resistance so that a pressure is applied thereto in response to the deflection of said shaft so as to vary the current in said circuit in proportion to the magnitude of said deflections, and means responsive to the current in said circuit for controlling said material supplying means so that the supply of said material is proportional to the variations in said current.

3. In a control system for a machine having a work performing member, means for supplying a load thereto whereby a pressure proportional to said load is applied to said member, resilient means mounting said member and providing for deflections thereof on opposite sides of a predetermined position in response to increases and decreases in said pressure, a Wheatstone bridge having a pressure responsive resistance arm, means for supplying an electromotive force to said bridge, means responsive to said deflection for applying a varying pressure to said resistance arm and producing across said bridge an electromotive force varying in respectively opposite directions from a predetermined value, and means responsive to said variations in said electromotive force for effecting respectively opposite operation of said load supplying means.

4. In a control system for a machine having a work performing member, a drive shaft supporting said member, means for feeding a material to said member, the pressure of said member on said shaft varying with the rate of feed of material, a resiliently mounted bearing means supporting said shaft and providing for deflection thereof on opposite sides of a predetermined position in response to variations in said pressure on said shaft, a source of voltage supply, a Wheatstone bridge supplied from said source and having an arm comprising a variable pressure responsive resistance, means actuated by said shaft deflection for applying a varying pressure to said resistance thereby to produce across said bridge an electromotive force varying in opposite senses from a predetermined value, an electric discharge device having an output circuit and an input circuit, means comprising connections between said bridge and input circuit for producing opposite variations in the magnitudes of the current in said output circuit responsive to said variations in electromotive force, and means responsive to said variations in current for effecting respectively opposite controlling operations of said feeding means.

5. A control system for a machine having a work performing member for carrying out a predetermined operation upon a material, feeding means for supplying said material to said member so that a pressure is applied thereto, an electric motor for driving said feeding means, an electric circuit, an electric discharge device and a pressure responsive resistance connected to said circuit, means responsive to said load pressure on said member for applying a pressure to said resistance and controlling the operation of said electric discharge device, and means responsive to said operation of said electric discharge device for controlling the operation of said motor.

6. A control system for a pulp grinding machine and the like having a member for carrying out a predetermined operation upon a material, comprising means for feeding said material to said machine so that a pressure is applied to said member, a motor for driving said feeding means, a source of electrical energy for supplying said motor, resilient supporting means providing for deflection of said member responsively to said pressure, a Wheatstone bridge having a pressure responsive resistance arm, a source of electrical supply for applying an electromotive force to said bridge, means responsive to said deflection for applying a pressure to said pressure responsive resistance arm and varying the electromotive force across said bridge, and means responsive to said variation of said electromotive force for controlling the energy supplied by said first mentioned source to said motor so as to maintain a predetermined pressure of material on said member.

7. A control system for a pulp grinding machine and the like having a member for carrying out a predetermined operation upon a material, comprising means for feeding material to said machine so that a pressure is applied to said member, a generator and a motor supplied therefrom for driving said feeding means, a resilient supporting means for said member providing for deflections thereof responsively to the load pressure on said member, a Wheatstone bridge having a carbon pile resistance arm, a source of alternating current for supplying said bridge, means responsive to deflection of said member for applying a pressure to said carbon pile resistance and varying the electromotive force across said bridge, and means including an electric discharge device having an input circuit connected to said bridge to be responsive to said electromotive force and an output circuit connected to said generator and controlled by said input circuit for controlling the operating speed of said motor to maintain a constant pressure of the material on said member.

8. A control system for a pulp grinding machine and the like having a power transmitting shaft and a work performing member carried thereby, means including a generator, a motor supplied from said generator and feeding means operated by said motor for supplying material to said member so that a pressure is applied thereto, a resilient bearing means for said shaft and providing for deflections thereof responsively to said pressure on said member, a Wheatstone bridge having a variable carbon pile arm, a source of supply for said bridge, means responsive to deflection of said shaft for applying a pressure to said carbon pile arm and varying the electromotive force across said bridge proportional to variations in the pressure on said member, means including an electric discharge device having an input circuit connected to said bridge and responsive to said electromotive force and an output circuit connected to said generator and controlled by said input circuit for controlling the operating speed of said motor to maintain a constant load pressure on said member.

9. In combination, a mechanism for performing a predetermined operation upon a material, load supply means comprising means for supplying said material to said mechanism, an electric circuit, means responsive to the load on said mechanism for effecting a variation in an electrical condition of said circuit, and an electric discharge device connected to said circuit and responsive to said variations in said electrical conditions for controlling the operation of said supply means.

10. In combination, a machine for carrying out a predetermined operation upon a material, said machine having a work performing member, means for supplying said material to said machine so that a pressure is applied to said member, an electric discharge device provided with an input circuit and an output circuit, means responsive to variations in the pressure on said member for effecting variations in an electrical condition of said input circuit to control an electrical condition of said output circuit, and means responsive to said electrical condition of said output circuit for controlling said supply means.

11. In combination a machine for carrying out a predetermined operation upon a material, said machine having a load supporting member, means for supplying said material to said machine so that a pressure is applied to said member, an electric discharge device, means responsive to the load pressure on said member for varying an operating condition of said discharge device, and means responsive to said operating condition for controlling said supply means.

JOHN H. PAYNE.

CERTIFICATE OF CORRECTION.

Patent No. 2,001,543.  May 14, 1935.

JOHN H. PAYNE.

It is hereby certified that error appears in the printed specification of the above numbered patent requiring correction as follows: Page 4, second column, strike out lines 42 to 51 inclusive, comprising claim 11; and that the said Letters Patent should be read with this correction therein that the same may conform to the record of the case in the Patent Office.

Signed and sealed this 25th day of June, A. D. 1935.

(Seal)

Bryan M. Battey
Acting Commissioner of Patents.